United States Patent
Baek et al.

(10) Patent No.: US 12,250,656 B2
(45) Date of Patent: Mar. 11, 2025

(54) METHOD AND APPARATUS FOR MEASURING POSITION OF TERMINAL IN WIRELESS COMMUNICATION SYSTEM

(71) Applicant: LG ELECTRONICS INC., Seoul (KR)

(72) Inventors: Jongseob Baek, Seoul (KR); Woosuk Ko, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 392 days.

(21) Appl. No.: 17/638,511

(22) PCT Filed: Aug. 31, 2020

(86) PCT No.: PCT/KR2020/011622
§ 371 (c)(1),
(2) Date: Feb. 25, 2022

(87) PCT Pub. No.: WO2021/040489
PCT Pub. Date: Mar. 4, 2021

(65) Prior Publication Data
US 2022/0361137 A1    Nov. 10, 2022

(30) Foreign Application Priority Data
Aug. 29, 2019  (KR) .......................... 10-2019-0106423

(51) Int. Cl.
*H04W 64/00*   (2009.01)
*G01S 5/02*    (2010.01)
*G01S 5/06*    (2006.01)

(52) U.S. Cl.
CPC ........... *H04W 64/00* (2013.01); *G01S 5/0244* (2020.05); *G01S 5/06* (2013.01)

(58) Field of Classification Search
CPC ......... H04W 64/00; G01S 5/0244; G01S 5/06
(Continued)

(56) References Cited

U.S. PATENT DOCUMENTS 9,571,978 B1 * 2/2017 Ananth ................. H04W 4/023
9,949,224 B1 * 4/2018 Balakrishnan ...... H04W 56/006
(Continued)

FOREIGN PATENT DOCUMENTS

JP   2012257245    12/2012
JP   2017527806    9/2017
(Continued)

OTHER PUBLICATIONS

Intel Corporation, "Analysis of Techniques for NR DL Positioning," 3GPP TSG-RAN WG1 Ad-Hoc Meeting 1901, R1-1900512, Jan. 2019, 27 pages.
(Continued)

*Primary Examiner* — Joel Ajayi
(74) *Attorney, Agent, or Firm* — LEE, HONG, DEGERMAN, KANG & WAIMEY

(57) ABSTRACT

A method by which a terminal operates in a wireless communication system, according to one embodiment, comprises the steps of: receiving time difference of arrival (TDoA) slots from anchor nodes (ANs); and measuring the position of the terminal by using the TDoA slots, wherein the TDoA slots include control information of the ANs and positioning reference signals (PRSs) of the ANs.

7 Claims, 25 Drawing Sheets

(58) Field of Classification Search
 USPC ...................................................... 455/456.1
 See application file for complete search history.

(56) References Cited

U.S. PATENT DOCUMENTS

| | | | | |
|---|---|---|---|---|
| 2003/0176196 | A1* | 9/2003 | Hall | H04W 64/00 |
| | | | | 455/456.1 |
| 2015/0257123 | A1* | 9/2015 | Bhuyan | H04W 64/006 |
| | | | | 455/456.1 |
| 2015/0339823 | A1 | 11/2015 | Siomina | |
| 2017/0289952 | A1 | 10/2017 | Muquet | |
| 2017/0339516 | A1 | 11/2017 | Edge et al. | |
| 2019/0230619 | A1 | 7/2019 | Cui et al. | |
| 2019/0239181 | A1 | 8/2019 | Gangakhedkar et al. | |

FOREIGN PATENT DOCUMENTS

| | | |
|---|---|---|
| JP | 2017223645 | 12/2017 |
| KR | 1020140022482 | 2/2014 |
| KR | 1020190026008 | 3/2019 |
| WO | 2019027245 | 2/2019 |
| WO | 2019143437 | 7/2019 |

OTHER PUBLICATIONS

PCT International Application No. PCT/KR2020/011622, Written Opinion of the International Searching Authority dated Dec. 8, 2020, 9 pages.
Japan Patent Office Application No. 2022-512777, Office Action dated Aug. 6, 2024, 5 pages.
The State Intellectual Property Office of the People's Republic of China Application Serial No. 202080060565.2, Office Action dated Aug. 26, 2024, 9 pages.
Huawei, "Discussion on OTDOA positioning", R2-1803631, 3GPP TSG-RAN WG2 Meeting #101, Mar. 2018, 4 pages.
Nokia, Nokia Shanghai Bell, "Dynamic PRS configuration for DL-TDOA positioning", R2-1907657, 3GPP TSG-RAN Wg2 Meeting #106, May 2019, 3 pages.

* cited by examiner

METHOD AND APPARATUS FOR MEASURING POSITION OF TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2020/011622, filed on Aug. 31, 2020, which claims the benefit of earlier filing date and right of priority to Korean Application No. 10-2019-0106423, filed on Aug. 29, 2019, the contents of which are all incorporated by reference herein in their entirety.

TECHNICAL FIELD

The present disclosure relates to a wireless communication system, and more particularly to a method for measuring the location of a user equipment (UE) using sidelink communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, UEs of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

An object of the present disclosure is to provide information as to which slot structure will be used to transmit a sidelink signal for UE positioning.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In accordance with an aspect of the present disclosure, a method for performing an operation by a user equipment (UE) in a wireless communication system may include receiving a TDoA (Time Difference of Arrival) slot from anchor nodes (ANs), and measuring a position of the UE using the TDoA slot, wherein the TDoA slot includes control information of the anchor nodes (ANs) and a positioning reference signal (PRS) of the anchor nodes (ANs).

In accordance with another aspect of the present disclosure, a UE for a wireless communication system includes at least one processor.

In accordance with another aspect of the present disclosure, a user equipment (UE) for use in a wireless communication system may include at least one processor, and at least one computer memory operatively connected to the at least one processor, and configured to store instructions such that the at least one processor performs specific operations by executing the instructions, wherein the specific operations include: receiving a TDoA (Time Difference of Arrival) slot from anchor nodes (ANs), and measuring a position of the UE using the TDoA slot, wherein the TDoA slot includes control information of the anchor nodes (ANs) and a positioning reference signal (PRS) of the anchor nodes (ANs).

In accordance with another aspect of the present disclosure, a processor for performing operations for a user equipment (UE) in a wireless communication system may include performing the operations, wherein the specific operations include receiving a TDoA (Time Difference of Arrival) slot from anchor nodes (ANs), and measuring a position of the UE using the TDoA slot, wherein the TDoA slot includes control information of the anchor nodes (ANs) and a positioning reference signal (PRS) of the anchor nodes (ANs).

In accordance with another aspect of the present disclosure, a computer-readable storage medium configured to store at least one computer program including instructions such that at least one processor performs specific operations for a user equipment (UE) by executing the instructions, the computer-readable storage medium may include performing the specific operations, wherein the specific operations include receiving a TDoA (Time Difference of Arrival) slot from anchor nodes (ANs), and measuring a position of the UE using the TDoA slot, wherein the TDoA slot includes control information of the anchor nodes (ANs) and a positioning reference signal (PRS) of the anchor nodes (ANs).

In an exemplary embodiment, the control information may include at least one of position information of the anchor nodes (ANs), a positioning quality indicator (PQI) of the anchor nodes (ANs), a PRS pattern of the anchor nodes (ANs), and period information of the TDoA slot used by the anchor nodes (ANs).

In an exemplary embodiment, the positioning quality indicator (PQI) may represent reliability of the position information of the anchor nodes (ANs), and the positioning quality indicator (PQI) is equal to or higher than a predetermined value.

In an exemplary embodiment, the anchor nodes (ANs) may sense and reserve resources of the TDoA slot, so that control information of the anchor nodes (ANs) and the positioning reference signal (PRS) are transmitted using the reserved resources.

In an exemplary embodiment, the method may further include selecting at least one positioning anchor node (AN) from among the anchor nodes (ANs) using either the position information of the ANs or the positioning quality indicator (PQI), wherein the position of the UE is measured in consideration of the at least one positioning anchor node (AN).

In an exemplary embodiment, the method may further include assigning a weight to the at least one positioning anchor node (AN), wherein the UE position is measured by further considering the weight.

In an exemplary embodiment, the weight may be assigned using the position information of the anchor nodes (ANs) or the PQI of the anchor nodes (ANs).

In an exemplary embodiment, the method may further include the TDoA slot is broadcast from the anchor nodes (ANs).

In an exemplary embodiment, the method may further include transmitting a request message to the anchor nodes (ANs), wherein the TDoA slot is received as a response to the request message.

In an exemplary embodiment, the TDoA slot may further include at least one of an AGC (auto-gain control) symbol and a guard symbol.

In an exemplary embodiment, the user equipment (UE) may communicate with at least one of another terminal, a terminal related to an autonomous vehicle, a base station (BS), and a network.

Advantageous Effects

As is apparent from the above description, the embodiments of the present disclosure can rapidly perform UE propositioning using sidelink communication, and can independently perform positioning without causing interference with the existing V2X slot.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the disclosure and together with the description serve to explain the principle of the disclosure. In the drawings.

BEST MODE

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
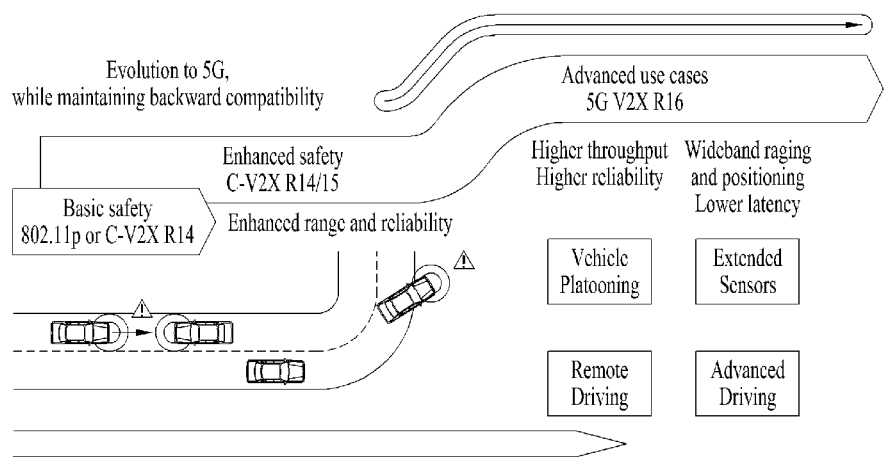
FIG. 1 is a diagram illustrating vehicle-to-everything (V2X) communication based on pre-new radio access technology (NR) RAT and V2X communication based on NR in comparison.
Figure 2:
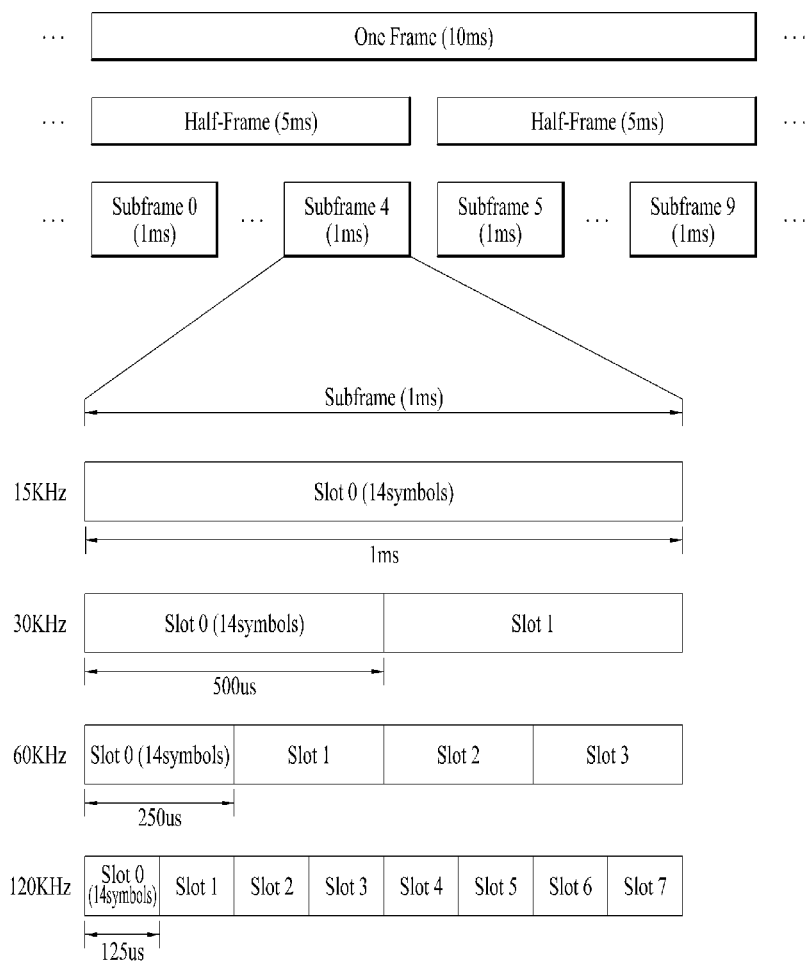
FIG. 2 is a diagram illustrating the structure of an NR radio frame to which embodiment(s) of the present disclosure is applicable.

FIG. 2 illustrates a radio frame structure in NR, to which embodiment(s) of the present disclosure is applicable.

Referring to FIG. 2, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 3:
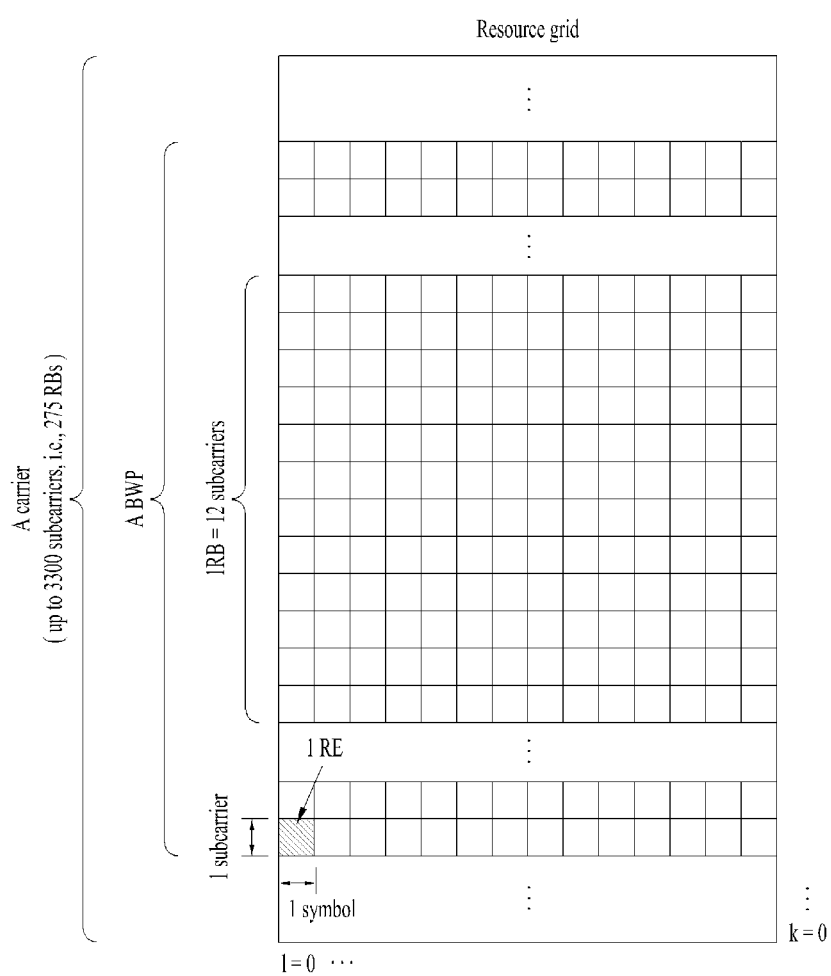
FIG. 3 is a diagram illustrating a slot structure in an NR frame according to an embodiment of the present disclosure.

FIG. 3 illustrates a slot structure in an NR frame according to an embodiment of the present disclosure.

Referring to FIG. 3, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Hereinafter, V2X or SL (sidelink) communication will be described.

Figure 4:
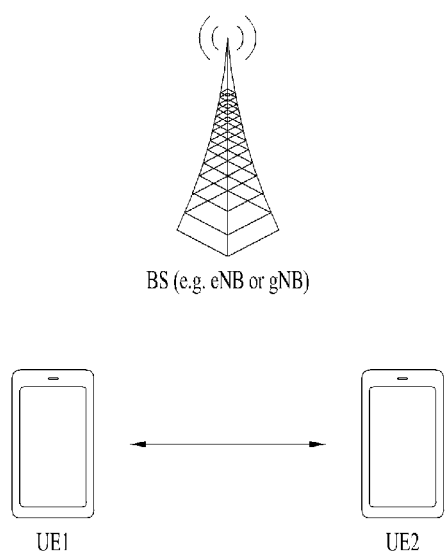
FIG. 4 illustrates UEs performing V2X or SL communication according to an embodiment of the present disclosure.

FIG. 4 illustrates UEs performing V2X or SL communication according to one embodiment of the present disclosure.

Referring to FIG. 4, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 5:
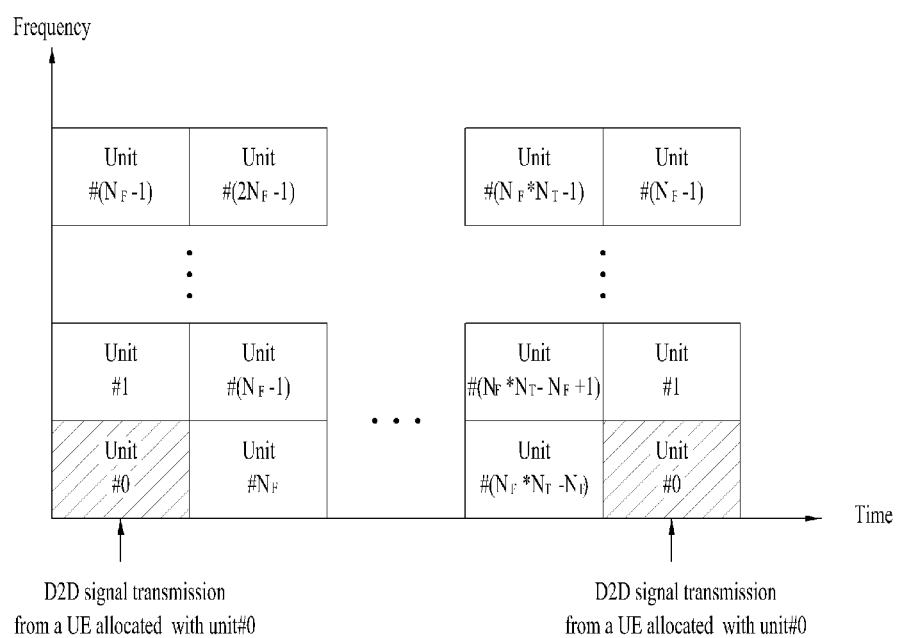
FIG. 5 illustrates resource units for V2X or SL communication according to an embodiment of the present disclosure.

FIG. 5 illustrates resource units for V2X or SL communication.

Figure 8:
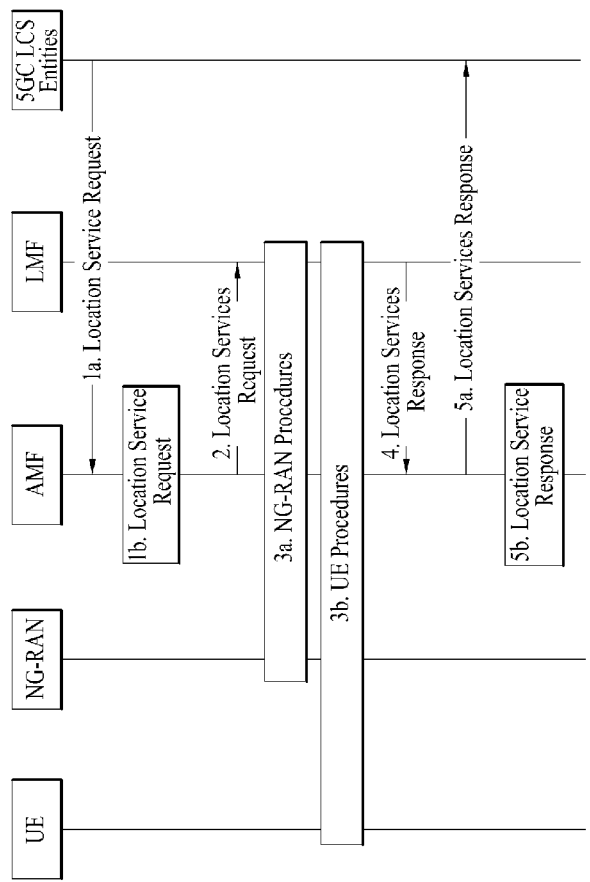
FIG. 8 is a diagram illustrating an implementation example of a network for positioning a UE according to an embodiment of the present disclosure.

Referring to FIG. 5, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 5, one resource unit (e.g., Unit #0) may appear periodically and repeatedly. Alternatively, in order to obtain a diversity effect in the time or frequency domain, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or a multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Sidelink Control Information (SCI) will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked on data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or SL channel state information (CSI) report request indicator or SL (L1) RSRP (and/or SL (L1) reference signal received quality (RSRQ) and/or SL (L1) received signal strength indicator (RSSI)) report request indicator, and/or SL CSI transmission indicator (on PSSCH) (or SL (L1) RSRP (and/or SL (L1) RSRQ and/or SL (L1) RSSI) information transmission indicator), and/or MCS information, and/or Transmission power information, and/or L1 destination ID information and/or L1 source ID information, and/or SL HARQ process ID information, and/or New data indicator (NDI) information, and/or Redundancy version (RV) information, and/or QoS information (related to transmission traffic/packet), for example, priority information, and/or SL CSI-RS transmission indicator or information about the number of SL CSI-RS antenna ports (to be transmitted);

Location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Figure 6:
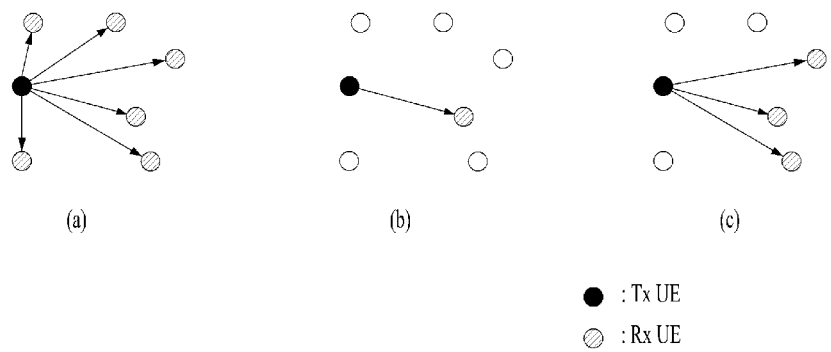
FIG. 6 is a diagram illustrating three kinds of cast types according to one embodiment of the present disclosure.

FIG. 6 illustrates three kinds of cast types according to one embodiment of the present disclosure.

Specifically, FIG. 6(a) shows SL communication of a broadcast type, FIG. 6(b) shows SL communication of a unicast type, and FIG. 6(c) shows SL communication of a groupcast type. In case of SL communication of a unicast type, a UE may perform one-to-one communication with another UE. In case of SL communication of a groupcast, a UE may perform SL communication with one or more UEs in a group to which the UE belongs. According to various embodiments of the present disclosure, SL groupcast communication may be substituted with SL multicast communication, SL one-to-many communication, etc.

Now, a description will be given of positioning.

Figure 7:
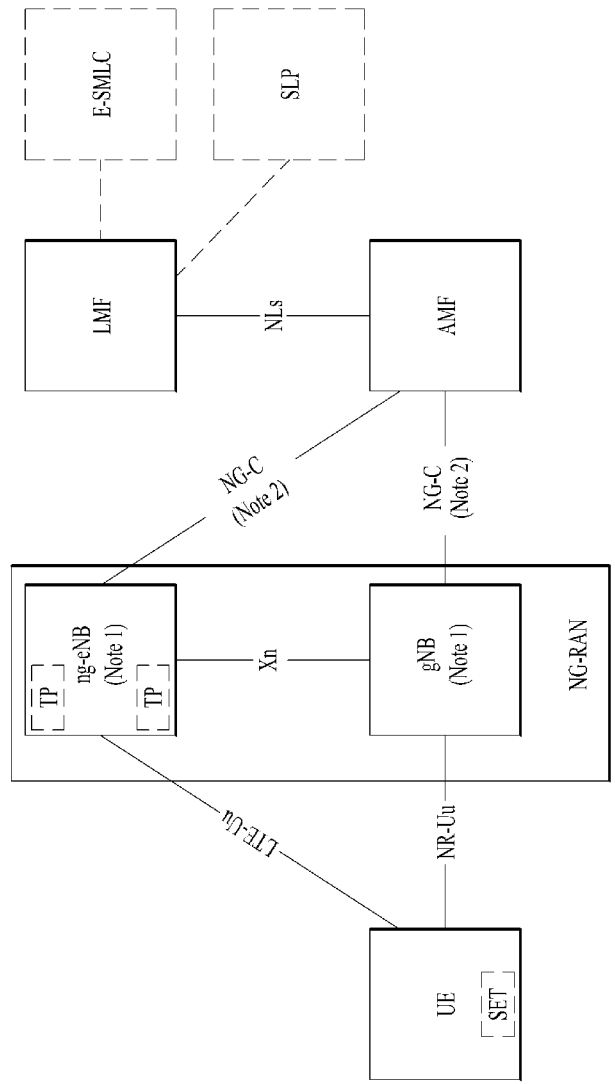
FIG. 7 is a diagram illustrating an exemplary architecture in a 5G system, for positioning a UE which has accessed an NG-RAN or an evolved UMTS terrestrial radio access network (E-UTRAN) according to an embodiment of the present disclosure.

FIG. 7 illustrates an exemplary architecture of a 5G system capable of positioning a UE connected to an NG-RAN or an E-UTRAN according to an embodiment of the present disclosure.

Referring to FIG. 7, an AMF may receive a request for a location service related to a specific target UE from another entity such as a gateway mobile location center (GMLC) or may autonomously determine to initiate the location service on behalf of the specific target UE. The AMF may then transmit a location service request to a location management function (LMF). Upon receipt of the location service request, the LMF may process the location service request and return a processing result including information about an estimated location of the UE to the AMF. On the other hand, when the location service request is received from another entity such as the GMLC, the AMF may deliver the processing result received from the LMF to the other entity.

A new generation evolved-NB (ng-eNB) and a gNB, which are network elements of an NG-RAN capable of providing measurement results for positioning, may measure radio signals for the target UE and transmit result values to the LMF. The ng-eNB may also control some transmission points (TPs) such as remote radio heads or positioning reference signal (PRS)-dedicated TPs supporting a PRS-based beacon system for E-UTRA.

The LMF is connected to an enhanced serving mobile location center (E-SMLC), and the E-SMLC may enable the LMF to access an E-UTRAN. For example, the E-SMLC may enable the LMF to support observed time difference of arrival (OTDOA), which is one of positioning methods in the E-UTRAN, by using DL measurements obtained by the target UE through signals transmitted by the eNB and/or the PRS-dedicated TPs in the E-UTRAN.

The LMF may be connected to an SUPL location platform (SLP). The LMF may support and manage different location determination services for target UEs. The LMF may interact with the serving ng-eNB or serving gNB of a target UE to obtain a location measurement of the UE. For positioning the target UE, the LMF may determine a positioning method based on a location service (LCS) client type, a QoS requirement, UE positioning capabilities, gNB positioning capabilities, and ng-eNB positioning capabilities, and apply the positioning method to the serving gNB and/or the serving ng-eNB. The LMF may determine additional information such as a location estimate for the target UE and the accuracy of the position estimation and a speed. The SLP is a secure user plane location (SUPL) entity responsible for positioning through the user plane.

The UE may measure a DL signal through sources such as the NG-RAN and E-UTRAN, different global navigation satellite systems (GNSSes), a terrestrial beacon system (TBS), a wireless local area network (WLAN) access point, a Bluetooth beacon, and a UE barometric pressure sensor. The UE may include an LCS application and access the LCS application through communication with a network to which the UE is connected or through another application included in the UE. The LCS application may include a measurement and calculation function required to determine the location of the UE. For example, the UE may include an independent positioning function such as a global positioning system (GPS) and report the location of the UE independently of an NG-RAN transmission. The independently obtained positioning information may be utilized as auxiliary information of positioning information obtained from the network.

FIG. 8 illustrates an exemplary implementation of a network for positioning a UE according to an embodiment of the present disclosure.

Upon receipt of a location service request when the UE is in a connection management-IDLE (CM-IDLE) state, the AMF may establish a signaling connection with the UE and request a network trigger service to assign a specific serving gNB or ng-eNB. This operation is not shown in FIG. 8. That is, FIG. 8 may be based on the assumption that the UE is in connected mode. However, the signaling connection may be released by the NG-RAN due to signaling and data deactivation during positioning.

Referring to FIG. 8, a network operation for positioning a UE will be described in detail. In step 1a, a 5GC entity such as a GMLC may request a location service for positioning a target UE to a serving AMF. However, even though the GMLC does not request the location service, the serving AMF may determine that the location service for positioning the target UE is required in step 1b. For example, for positioning the UE for an emergency call, the serving AMF may determine to perform the location service directly.

The AMF may then transmit a location service request to an LMF in step 2, and the LMF may start location procedures with the serving-eNB and the serving gNB to obtain positioning data or positioning assistance data in step 3a. In addition, the LMF may initiate a location procedure for DL positioning with the UE in step 3b. For example, the LMF may transmit positioning assistance data (assistance data defined in 3GPP TS 36.355) to the UE, or obtain a location estimate or location measurement. Although step 3b may be additionally performed after step 3a, step 3b may be performed instead of step 3a.

In step 4, the LMF may provide a location service response to the AMF. The location service response may include information indicating whether location estimation of the UE was successful and the location estimate of the UE. Then, when the procedure of FIG. 8 is initiated in step 1a, the AMF may deliver the location service response to the 5GC entity such as the GMLC. When the procedure of FIG. 8 is initiated in step 1b, the AMF may use the location service response to provide the location service related to an emergency call or the like.

Figure 9:
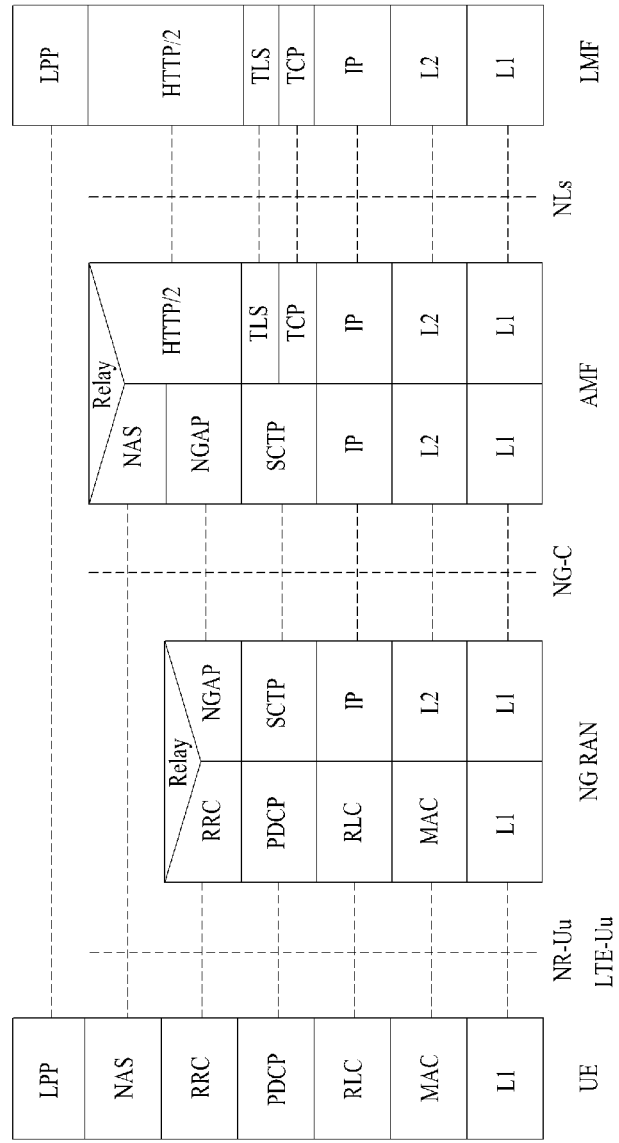
FIG. 9 illustrates exemplary protocol layers used to support LTE positioning protocol (LPP) message transmission between an LMF and a UE according to an embodiment of the present disclosure.

FIG. 9 illustrates exemplary protocol layers used to support LTE positioning protocol (LPP) message transmission between an LMF and a UE according to an embodiment of the present disclosure.

An LPP PDU may be transmitted in a NAS PDU between the AMF and the UE. Referring to FIG. 9, the LPP may be terminated between a target device (e.g., a UE in the control plane or a SUPL enabled UE (SET) in the user plane) and a location server (e.g., an LMF in the control plane or an SLP in the user plane). An LPP message may be transmitted in a transparent PDU over an intermediate network interface by using an appropriate protocol such as the NG application protocol (NGAP) via an NG-control plane (NG-C) interface or a NAS/RRC via LTE-Uu and NR-Uu interfaces. The LPP allows positioning for NR and LTE using various positioning methods.

For example, the target device and the location server may exchange capability information with each other, positioning assistance data and/or location information over the LPP. Further, error information may be exchanged and/or discontinuation of an LPP procedure may be indicated, by an LPP message.

Figure 10:
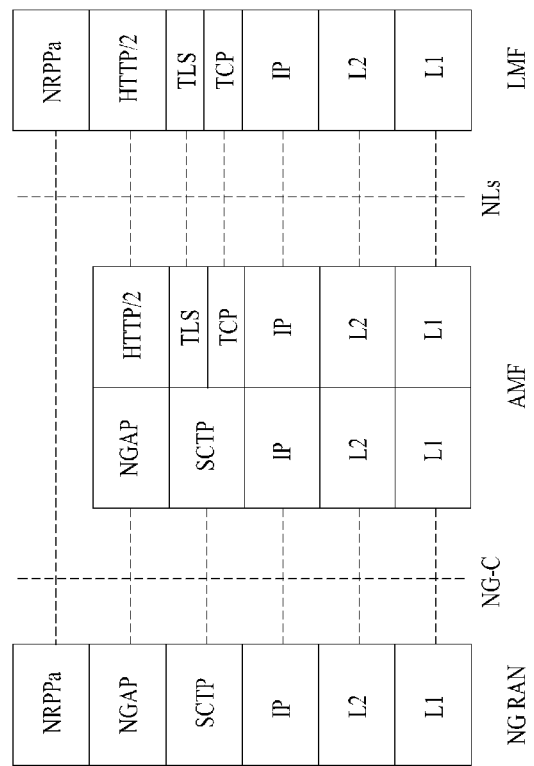
FIG. 10 illustrates exemplary protocol layers used to support NR positioning protocol A (NRPPa) PDU transmission between an LMF and an NG-RAN node according to an embodiment of the present disclosure.

FIG. 10 illustrates exemplary protocol layers used to support NR positioning protocol A (NRPPa) PDU transmission between an LMF and an NG-RAN node according to an embodiment of the present disclosure.

NRPPa may be used for information exchange between the NG-RAN node and the LMF. Specifically, NRPPa enables exchange of an enhanced-cell ID (E-CID) for a measurement transmitted from the ng-eNB to the LMF, data to support OTDOA positioning, and a Cell-ID and Cell location ID for NR Cell ID positioning. Even without information about a related NRPPa transaction, the AMF may route NRPPa PDUs based on the routing ID of the related LMF via an NG-C interface.

Procedures of the NRPPa protocol for positioning and data collection may be divided into two types. One of the two types is a UE-associated procedure for delivering information (e.g., positioning information) about a specific UE, and the other type is a non-UE-associated procedure for delivering information (e.g., gNB/ng-eNB/TP timing information) applicable to an NG-RAN node and related TPs. The two types of procedures may be supported independently or simultaneously.

Positioning methods supported by the NG-RAN include GNSS, OTDOA, E-CID, barometric pressure sensor positioning, WLAN positioning, Bluetooth positioning, terrestrial beacon system (TBS), and UL time difference of arrival (UTDOA). Although a UE may be positioned using any of the above positioning methods, two or more positioning methods may be used to position the UE.

(1) Observed Time Difference of Arrival (OTDOA)

Figure 11:
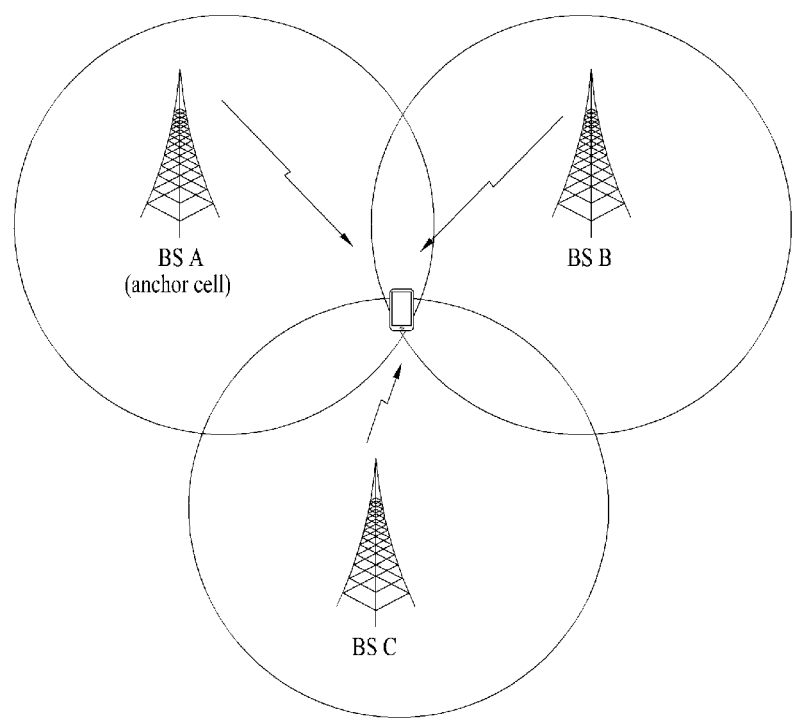
FIG. 11 is a diagram illustrating an OTDOA (Observed Time Difference Of Arrival) positioning method according to an embodiment of the present disclosure.

FIG. 11 is a diagram illustrating an OTDOA positioning method according to an embodiment of the present disclosure.

In the OTDOA positioning method, a UE utilizes measurement timings of DL signals received from multiple TPs including an eNB, an ng-eNB, and a PRS-dedicated TP. The UE measures the timings of the received DL signals using positioning assistance data received from a location server. The location of the UE may be determined based on the measurement results and the geographical coordinates of neighboring TPs.

A UE connected to a gNB may request a measurement gap for OTDOA measurement from a TP. When the UE fails to identify a single frequency network (SFN) for at least one TP in OTDOA assistance data, the UE may use an autonomous gap to acquire the SFN of an OTDOA reference cell before requesting a measurement gap in which a reference signal time difference (RSTD) is measured.

An RSTD may be defined based on a smallest relative time difference between the boundaries of two subframes received from a reference cell and a measurement cell. That is, the RSTD may be calculated as a relative timing difference between a time when the UE receives the start of a subframe from the reference cell and a time when the UE receives the start of a subframe from the measurement cell which is closest to the subframe received from the reference cell. The reference cell may be selected by the UE.

For accurate OTDOA measurement, it is necessary to measure the times of arrival (TOAs) of signals received from three or more geographically distributed TPs or BSs. For example, TOAs for TP 1, TP 2, and TP 3 may be measured, an RSTD for TP 1–TP 2, an RSTD for TP 2–TP 3, and an RSTD for TP 3–TP 1 may be calculated based on the three TOAs, geometric hyperbolas may be determined based on the calculated RSTDs, and a point where these hyperbolas intersect may be estimated as the location of the UE. Accuracy and/or uncertainty may be involved in each TOA measurement, and thus the estimated UE location may be known as a specific range according to the measurement uncertainty.

For example, an RSTD for two TPs may be calculated by Equation 1.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 1]

In Equation 1, 'c' is the speed of light, {xt, yt} is the (unknown) coordinates of the target UE, {xi, yi} is the coordinates of a (known) TP, and {x1, y1} is the coordinates of a reference TP (or another TP). (Ti–T1) is a transmission time offset between the two TPs, which may be referred to as "real time difference" (RTD), and 'ni' and 'n1' may represent values related to UE TOA measurement errors.

(2) E-CID (Enhanced Cell ID)

In cell ID (CID) positioning, the location of a UE may be measured based on geographic information about the serving ng-eNB, serving gNB and/or serving cell of the UE. For example, the geographic information about the serving ng-eNB, the serving gNB, and/or the serving cell may be obtained by paging, registration, or the like.

For E-CID positioning, an additional UE measurement and/or NG-RAN radio resources may be used to improve a UE location estimate in addition to the CID positioning method. In the E-CID positioning method, although some of the same measurement methods as in the measurement control system of the RRC protocol may be used, an additional measurement is generally not performed only for positioning the UE. In other words, a separate measurement configuration or measurement control message may not be provided to position the UE, and the UE may also report a measured value obtained by generally available measurement methods, without expecting that an additional measurement operation only for positioning will be requested.

For example, the serving gNB may implement the E-CID positioning method using an E-UTRA measurement received from the UE.

Exemplary measurement elements that are available for E-CID positioning are given as follows.

UE measurements: E-UTRA RSRP, E-UTRA RSRQ, UE E-UTRA RX-TX time difference, GSM EDGE random access network (GERAN)/WLAN RSSI, UTRAN common pilot channel (CPICH) received signal code power (RSCP), and UTRAN CPICH Ec/Io.

E-UTRAN measurements: ng-eNB RX-TX time difference, timing advance (TADV), and angle of arrival (AoA).

TADVs may be classified into Type 1 and Type 2 as follows.

TADV Type 1=(ng–eNB RX-TX time difference)+(UE E-UTRA RX-TX time difference)

TADV Type 2=ng–eNB RX-TX time difference

On the other hand, an AoA may be used to measure the direction of the UE. The AoA may be defined as an estimated angle of the UE with respect to the location of the UE counterclockwise from a BS/TP. A geographical reference direction may be North. The BS/TP may use a UL signal such as a sounding reference signal (SRS) and/or a DMRS for AoA measurement. As the arrangement of antenna arrays is larger, the measurement accuracy of the AoA is higher. When the antenna arrays are arranged at the same interval, signals received at adjacent antenna elements may have a constant phase change (phase rotation).

(3) UTDOA (Uplink Time Difference of Arrival)

UTDOA is a method of determining the location of a UE by estimating the arrival time of an SRS. When the estimated SRS arrival time is calculated, a serving cell may be used as a reference cell to estimate the location of the UE based on the difference in arrival time from another cell (or BS/TP). In order to implement the UTDOA method, an E-SMLC may indicate the serving cell of a target UE to indicate SRS transmission to the target UE. Further, the E-SMLC may provide a configuration such as whether an SRS is periodic/aperiodic, a bandwidth, and frequency/group/sequence hopping.

EMBODIMENTS

The present disclosure proposes a method and a procedure for enabling the UE to effectively perform TDoA positioning (UE-based Sidelink TDoA) using a sidelink in an NR-V2X system.

In particular, the present disclosure proposes independent TDoA slot insertion distinguished from the existing NR-V2X slot in a sidelink NR-V2X system. The proposed TDoA slot may have a structure including both a PSCCH for transmitting sidelink control information (SCI) of an anchor node (AN) required for UE positioning and a positioning reference signal (PRS) for measuring a time of arrival (ToA). Therefore, the UE can perform a simple positioning operation by receiving the TDoA slot from the AN. In addition, the present disclosure proposes a method for enabling the UE to effectively perform 1) the broadcast TDoA mode and 2) the on-demand TDoA mode using the TDoA slot structure, and describes a procedure for performing each mode.

The present disclosure relates to a method for measuring the position of a UE through a sidelink by a UE and an AN in the NR-V2X system. In particular, the present disclosure relates to a method for enabling the UE to receive necessary information from the AN and perform positioning. Here, the UE may be a mobile device, a V2X module, or an IoT device, and the AN may be a base station (BS) and/or a UE. In this case, the BS serving as the AN may include an eNB, a gNB, an LTE-LAA, a NR-U, a TP (Transmission point), a Remote Head Control (RHC), and a gNB-type RSU (Road-Side Unit) capable of providing fixed (or absolute) position information. On the other hand, the UE serving as the AN may include a UE capable of providing high-reliability position information, and a UE-type RSU capable of providing fixed position information. In addition, TDoA positioning may include ToA positioning, such that the slot structure proposed for TDoA and the procedure for performing the TDoA can be equally applied to TDoA positioning.

In the above-described general positioning technology, the UE positioning based on OTDoA (Observed TDoA) of the NR system may allow the location server/LMF and/or AN to transmit a request to the UE so that the UE can measure RSTD information required for OTDoA positioning and can report the measured RSTD information through the Uu interface. Thereafter, the UE position is measured using the received RSTD, and the measured UE position is re-transmitted to the UE. The UE positioning method based on the location server/LMF and/or AN can finally reduce the reliability of information by finally causing a large delay until the UE receives location information. In particular, the physical delay generated in the positioning operation can significantly reduce reliability of the information in proportion to the increasing UE speed in the NR-V2X system. Therefore, in order to solve the above-described problems, the present disclosure may consider a method for enabling the UE to directly perform TDoA positioning.

Hereinafter, the principal features proposed in the present disclosure are summarized as follows.

The present disclosure proposes a method for using the TDoA slot as a method for effectively performing TDoA positioning using a sidelink in the NR-V2X system, and also proposes the use of two operation modes using the TDoA slot. Meanwhile, the TDoA slot may be a slot structure used for UE positioning.

TDoA slot structure for sidelink TDoA positioning

The TDoA slot structure is an independent slot distinguished from the sidelink NR-V2X slot, and may include a PSCCH for providing the SCI of the AN and the PRS for ToA measurement. Here, the PSCCH may include position information of the AN, a positioning quality indicator (PQI) related to the AN position information, PRS pattern (or PRS ID) information used in the AN, TDoA slot period information used by AN, and the like. The configuration information related to the other TDoA slots may be included in or may not be included in the PSCCH according to the TDoA operation mode.

Positioning Mode for TDoA Slot Structure

Broadcast TDoA positioning mode

The AN may periodically broadcast PSCCH information and PRS required for TDoA positioning by the UE through the TDoA slot. The UE may periodically receive PDSCCH information and PRS through the TDoA slot, and may thus perform TDoA positioning.

On-demand TDoA positioning mode

Upon receiving a request for TDoA positioning information from the UE, the AN may transmit PSCCH information and PRS required for UE's TDoA positioning through the slot. In addition, the UE may receive the PSCCH information and the PRS through the TDoA slot so as to perform such TDoA positioning.

The following embodiments described below are independently applicable and can be applied at the same time.

TDoA Slot

TDoA slot structure for sidelink TDoA positioning will hereinafter be described in detail.

Figure 12:
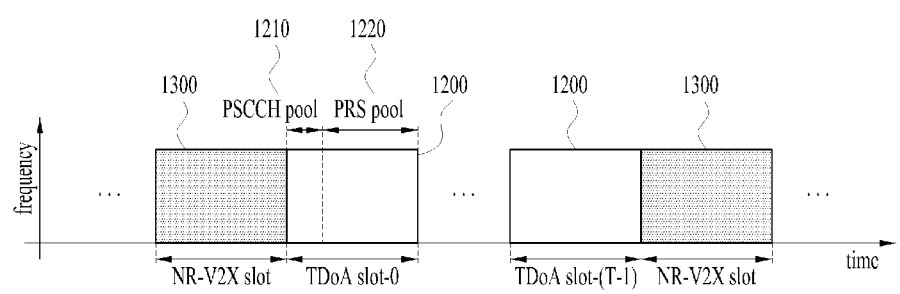
FIGS. 12 to 15 are diagrams illustrating the embodiment(s) of the present disclosure.
Figure 13:
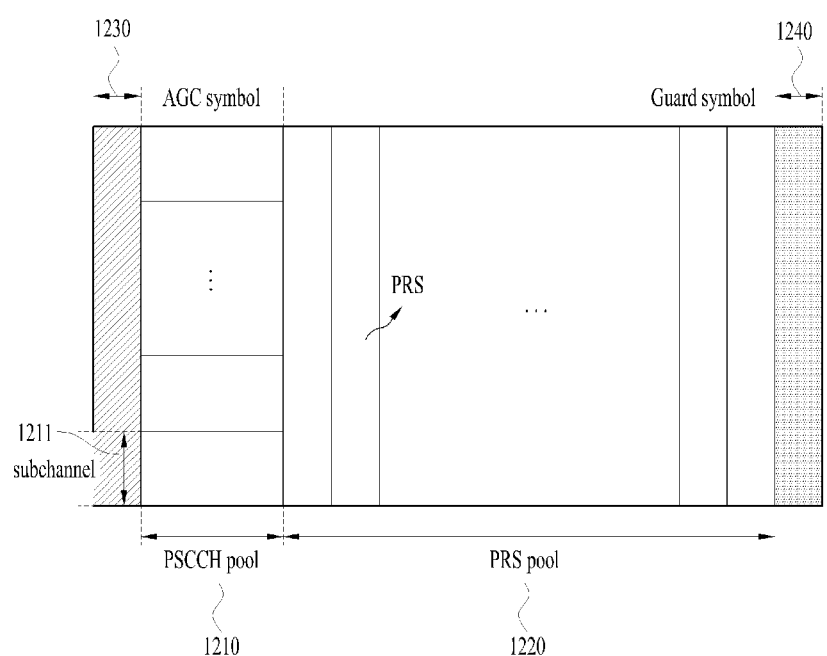
Figure 14:
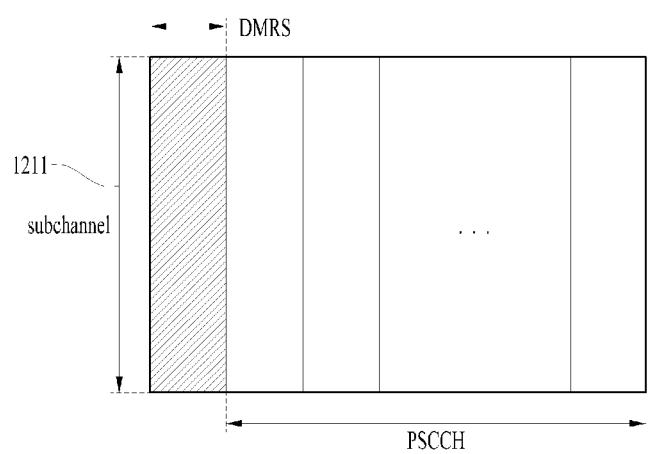

FIGS. 12 to 14 are diagrams illustrating examples of the TDoA slot structure.

The TDoA slot may be a slot proposed for effectively performing sidelink TDoA positioning in the NR-V2X experience system.

Referring to FIG. 12, the TDoA slot 1200 may be separately configured after being distinguished from the NR-V2X slot 1300. According to a method for minimizing not only interference with the NR-V2X service caused by adding the sidelink TDoA positioning operation to the legacy sidelink NR-V2X system, but also the increasing signaling overhead for the positioning operation, the TDoA slot 1200 can be inserted into an array of the NR-V2X slot 1300 using TDMA (Time Division Multiple Access). In other words, in order to simplify the TDoA positioning operation, the TDoA positioning-dedicated TDoA slot distinguished from the NR-V2X slot can be configured, and the TDoA slot can be inserted into the legacy NR-V2X slot array.

On the other hand, the TDoA slot described in the present disclosure may be a slot to which a PRS for UE positioning can be transmitted, and may also be referred to by various names such as PRS slot, positioning slot, etc.

More specifically, the TDoA slot 1200 may not allow NR-V2X service transmission to minimize interference with the NR-V2X service. Therefore, the TDoA slot and the NR-V2X slot may coexist without causing mutual interference. In addition, the TDoA slot can be arranged in various ways according to the TDoA operation and the NR-V2X system operation method. For example, as shown in FIG. 12, the plurality of TDoA slots may be successively arranged in the order of TDoA slot-0 to TDoA slot-(T-1). Here, T denotes the number of consecutive TDoA slots. In this case, the respective TDoA slots may repeatedly have the same PSCCH and PRS information. When the number of ANs exceeds the number of ANs supported by one TDoA slot, different PSCCHs and different PRSs may be allocated to the respective TDoA slots. In other words, each of T TDoA slots may include the same PSCCH and PRS information. Alternatively, if the number of ANs exceeds the number of ANs supported by one TDoA slot, the PSCCHs and PRSs of the ANs may be included in two or more TDoA slots, and two or more TDoA slots may be repeated.

In addition, the TDoA slots 1200 may be periodically or aperiodically arranged and used. The TDoA operation mode considering the TDoA slot structure and the related operation will be described later.

On the other hand, the TDoA slot 1200 may include the PSCCH pool 1210 and the PRS pool 1220. In this case, the PSCCH pool 1210 may include a plurality of PSCCHs, and each PSCCH may transmit SCI information for each SN needed for TDoA positioning of the UE. In this case, the SCI may include AN position information, PQI (Positioning Quality Indicator) information for determining the accuracy or QoS of the AN position information, PRS pattern information used in the AN, periodic information of the TDoA slot used in the AN, etc.

In addition, the PRS pool 1220 may include a plurality of PRS patterns, and the respective ANs may use different PRS patterns. A detailed description related to the PSCCH pool and the PRS pool will be described later.

The TDoA slot may basically include a subchannel, a PRS, an AGC (Auto-Gain Control) symbol, and a guard symbol.

Referring to FIG. 13, the TDoA slot may include a PSCCH pool 1210, a PRS pool 1220, an AGC (Auto-Gain Control) symbol 1230, and a guard symbol 1240. PSCCH pool 1210 may include a plurality of subchannels 1211. The respective subchannels may be assigned to different ANs.

Subchannel: Subchannel, which may include a plurality of RBs, may be located before the PRS pool 1220 or after the AGC symbol 1230, and each subchannel may be assigned to one AN. In addition, the size and number of subchannels used in one TDoA slot may be determined according to the PSSCH size of each AN, and may be pre-defined or may be determined by a location server/LMF and/or AN.

FIG. 14 shows the structure of a subchannel.

Referring to FIG. 14, the subchannel 1211 may include a PSCCH and a demodulation reference symbol (DMRS). In addition, the PSCCH may be transmitted using one or more OFDM symbols, and the OFDM symbol through which the PSCCH is transmitted may be defined in advance or may be determined by a location server/LMF and/or AN. In addition, the DMRS used to estimate channel information required to demodulate the PSCCH may consist of one or more OFDM symbols, and may be disposed at any position including the first symbol of the subchannel. The number of OFDM symbols for the DMRS and the location of the DMRS may be defined in advance or may be determined by the location server/LMF and/or the base station (BS).

PRS: Referring to FIG. 13, the PRS may be located behind the PSCCH pool 1210. During the PRS transmission period, each AN may transmit a PRS to the UE using a predefined PRS pattern, and the UE may perform ToA measurement using the received PRS. The frequency bandwidth for PRS transmission may be allocated through a plurality of RB configurations, and may be less than or equal to the total available frequency bandwidth allocated to the system. FIG. 13 shows that one PRS is transmitted through the entire effective frequency bandwidth according to an embodiment. In addition, PRS of each AN may be transmitted using one or more OFDM symbols, and PRSs of the plurality of ANs may be simultaneously transmitted through PRS multiplexing using different PRS patterns. The number of OFDM symbols and the number of PRS multiplexing operations for such PRS transmission may be defined in advance or may be determined by the location server/LMF and/or the base station (BS).

Guard symbol: the guard symbol 1240 may be located at the end of the PRS slot, and may or may not be inserted as a symbol for guaranteeing the time taken to switch the sidelink Time-Division Duplex (TDD) mode from a DL (Downlink) mode to a UL (Uplink) mode. When the plurality of PRS slots is consecutively arranged, the guard symbol may be inserted at the end of each PRS slot or may be inserted only at the end of the last PRS slot. Alternatively, when the TDoA slots are consecutively arranged, the guard symbol may be inserted into the end of each TDoA slot or may be inserted only into the end of the last TDoA slot. Whether or not to insert such a guard symbol and/or a location may be defined in advance or may be determined by the location server/LMF and/or the base station (BS).

AGC symbol: The AGC symbol 1230 may be located at the head of the TDoA slot. In addition, the AGC symbol may or may not be inserted as a symbol for guaranteeing a time required for the AGC operation. When the plurality of TDoA slots is consecutively arranged, the AGC symbol may be inserted at the head of each TDoA slot or may be inserted only at the head of the last TDoA slot. Whether to insert the AGC symbol and/or the insertion location may be defined in advance or may be determined by the location server/LMF and/or the base station.

Broadcast TDoA Positioning Mode

Hereinafter, a broadcast TDoA positioning mode using the TDoA slot structure described above will be described. The proposed broadcast TDoA positioning mode can determine whether the AN will participate in the positioning process, and the AN participating in the positioning process periodically can broadcast PSCCH information and PRS required for TDoA positioning in the UE through the TDoA slot. The UE may periodically receive the PSCCH information and PRS through the TDoA slot to perform TDoA positioning. The overall procedure for performing broadcast TDoA positioning is as follows.

[STEP A-0]: This step A-0 is a description of a method for obtaining and collecting the TDoA positioning operation and the TDoA slot structure information by the BS and/or UE, each of which serves as the AN for a UE that attempts to perform sidelink TDoA positioning.

First, information related to the TDoA positioning operation and information related to the TDoA slot structure will be described.

Information related to the TDoA positioning operation
Frequency bandwidth allocated to PRS transmission for TDoA positioning
Information about whether to support Inter-frequency TDoA
Information about whether to support the 3D position information of the AN: Default 3D position information is supported.
PRS type: PRS for ToA measurement (e.g., SRS (Sound Reference Signal) or any PRS)
PRS pattern (or PRS ID):
PRS comb-type information: PRS frequency offset information
PRS Cyclic Shift (CS) Information
　The number of PRS symbols: The number of OFDM symbols used for PRS
　PRS symbol position: The position of OFDM symbol to which the PRS is transmitted
TDoA slot structure related information:
　The number of TDoA slots: The number of TDoA slots consecutively arranged
　TDoA slot period: A separation time between TDoA slots, and the number of separated slots.
　TDoA slot offset: In the TDoA slot structure transmitted periodically, a separation time between DFN (Direct Frame Number=0) and the first TDoA slot or the number of separated slots.
　TDoA slot muting: In the TDoA slot structure periodically transmitted, the position of a TDoA slot (or a zero-powered TDoA slot) to which the PSCCH and the PRS are not transmitted.
　The number of subchannels in the TDoA slot: The maximum number of ANs supportable by one TDoA slot First, it may be possible to consider a case in which the UE exists within the location server/LMF and/or the base station (BS) coverage. Information related to the TDoA slot structure and the TDoS positioning operation described above may be provided through the MIB/SIB of a PSBCH transmitted through the NR-V2X slot of FIG. 12, and such related information can be periodically or aperiodically changed by the location server/LMF and/or the base station (BS). Therefore, the BS serving as the AN for the UE that wants to perform sidelink TDoA positioning, and/or the UE may receive the PSBCH transmitted through the NR-V2X slot, so that the configuration information required for sidelink TDoA positioning can be obtained.

Second, it may be possible to consider a case in which the UE is located outside either the location server/LMF and/or the BS coverage or TDoA positioning should be performed without assistance from the location server/LMF and/or the BS. In this environment, information related to the TDoA slot structure and the TDoA positioning operation may be provided by defining a default TDoA positioning operation in advance. Therefore, the BS and/or the UE, each of which serves as an AN for a UE attempting to perform sidelink TDoA positioning, can obtain configuration information required for sidelink TDoA positioning using not only the default TDoA slot structure predefined or stored, but also parameters related to the TDoA positioning operation.

[STEP A-1]: STEP-A-1 is a first step for sidelink TDoA positioning. The first step may indicate information as to which BS and/or UE will participate in positioning as the candidate AN. In this case, the candidate AN may refer to a candidate BS and/or UE capable of transmitting the PSCCH and the PRS in the TDoA slot. In addition, the final AN may serve as the finally selected BS and/or UE from among the candidate ANs, such that the final AN can transmit the PSCCH and PRS in the TDoA slot. A method for selecting the final AN will be described in the following [STEP A-2]. A method for determining the candidate AN scheduled to participate in TDoA positioning for the BS and/or UE will hereinafter be described in detail.

For example, information as to whether the BS and/or the UE will participate in TDoA positioning as the candidate AN may be determined by each BS and/or UE using PQI information for the location information. For example, when the measured PQI is higher than a specific threshold, each BS and/or UE can perform the procedure STEP-2 by serving as the candidate AN. When the measured PQI is equal to or less than the specific threshold, each BS and/or UE can determine the absence of the candidate AN. Here, PQI may refer to the reliability of position of each BS and/or UE. At this time, the specific threshold may be predefined, and may be determined by the location server/LMF and/or BS, so that the determined threshold can be transmitted to the BS and the UE.

In another embodiment, information as to whether to participate in TDOA positioning as a candidate AN may be determined by the location server/LMF and/or the base station. In particular, when the UE is considered as a candidate AN, the location server/LMF and/or the BS can inform the UE of the presence or absence of the candidate AN using UE-reported position information or PQI information. At this time, the UE may periodically report position information or PQI information to the location server/LMF and/or the BS. Alternatively, the UE may aperiodically report the position information or PQI information to the location server/LMF and/or the BS only upon receiving a request from the BS. On the other hand, separate position information or the PQI report process may not be required for the BS and/or UE, each of which has fixed position information.

In another embodiment, information as to whether to participate in the TDoA positioning as the candidate AN may be determined in advance without execution of the determining process based on the position information or PQI or without execution of the determining process by the location server/LMF and/or BS. For example, the BS and/or UE, each of which has fixed position information may always participate in the UE's TDoA position as the candidate AN.

[STEP A-2]: Step A-2 is a second process for sidelink TDoA positioning. The second step may indicate information as to which BS and/or UE will participate in positioning as the final AN.

For example, selection of the final AN from among candidate ANs may be performed through a sensing and/or contention process between candidate ANs (sensing-based and/or contention-based). The candidate AN may select and reserve a PSCCH that is not used or scheduled to be used by another AN by sensing the PSCCH pool (or subchannel) of the TDoA slot transmitted periodically or aperiodically. PSCCH that can be used or scheduled to be used by another AN may not be selected and reserved. In the TDoA slot structure, after RSSI (Received Signal Strength Indicator) for PSCCH of each subchannel or RSRP (Reference Signal Received Power) for DMRS is measured, if the RSSI or the RSRP is less than a specific threshold, the corresponding channel is determined to be an available subchannel, a reservation process for the subchannel is performed, and the PRS pattern can be determined. At this time, the threshold may be defined differently according to the PQI, or may be determined by the location server/LMF and/or the BS, so that the determined threshold can be transmitted to the BS and the UE. As a result, the final AN may refer to a candidate AN that is successful in reservation of the available resources of the TDoA slot.

In another embodiment, the final AN from among the candidate ANs may be selected by the location server/LMF and/or the BS. Particularly, when the UE is considered as the final AN, the location server/LMF and/or the BS can provide the UE with information about determination or non-determination of the final AN, the position of a subchannel to be used in the TDoA slot, and PRS pattern information using the UE-reported position information or PQI information.

[STEP A-3]: Step A-3 is a third process for sidelink TDoA positioning. In step A-3, the AN finally selected in step A-2 transmits the PSCCH and PRS through the TDoA slot.

For example, the AN may transmit SCI that includes position information, PQI for the position information, PRS pattern information, information related to the TDoA slot period, etc. through the PSCCH. Here, the PQI provision for the position information may allow the UE to consider whether to determine the corresponding AN in positioning. For example, if the UE considers a local based service (LBS) requiring very high positioning accuracy, only an AN having a PQI higher than a specific threshold may be considered in the TDoA positioning and an AN having a PQI lower than the specific threshold may be excluded from the TDoA positioning. At this time, the threshold can be defined differently according to LBS, and may be determined by the location server/LMF and/or the BS, so that the threshold can be transmitted to the BS and the UE. In addition, information related to the TDoA slot period of the AN may indicate the time for the next TDoA slot and information as to whether or not the time was used, and can be used in the final AN determination process for the sensing operation of the above step A-2.

The AN may transmit the PRS using the defined PRS pattern. In this case, the number of OFDM symbols for the PRS and the OFDM symbol position where the PRS is transmitted may be defined in advance, may be determined by the location server/LMF and/or the BS, so that the determined information can be transmitted to the BS and the UE.

[STEP A-4]: Step A-4 is the last step of the TDoA positioning, so that the UE can perform positioning upon receiving the TDoA slot.

For example, the UE may acquire ACI information related to each AN by demodulating the PSCCH of the received TDoA slot, and may measure the ToA for the PRS transmitted from each AN. Hereinafter, the TDoA positioning operation using the measured ToA, position information of each AN, PQI information, etc. will be described in detail.

AN selection step: The UE can select the AN capable of improving the positioning performance of the UE using the acquired AN position information and the PQI information.

For example, the UE can select the AN required for positioning using the position information of each AN. For example, when an approximate initial position information of the UE is given, the UE can select the AN capable of improving the UE positioning performance in view of a topology. If the UE selects three ANs to perform positioning, the UE can select three ANs which can form a regular triangle shape around the UE from the viewpoint of a topology. In addition, if the AN position is not helpful to the UE positioning in view of the topology, the AN may not be selected.

In addition, the UE can select the AN required for positioning using the PQI information provided from each AN. For example, if the LBS service to be performed by the UE requires a PQI greater than a specific threshold, the AN providing a PQI less than the threshold can be excluded during the positioning process.

Step of determining the weight of the AN: The UE may allocate different weights to the ANs selected in the above-described AN selection step, resulting in an increase in TDoA positioning accuracy.

For example, the UE can determine the AN weight using the position information of each AN. In other words, the UE may allocate a high weight to an AN, which is determined to have a great influence on positioning performance improvement in terms of topology, and may allocate a low weight to an AN determined to have a relatively small influence on the positioning performance improvement.

Alternatively, the UE can determine the weight for an AN using the PQI information provided by each AN. That is, when the PQI is high, a high weight is set for the AN, and a low weight can be set for the AN providing a relatively low PQI. At this time, the high or low PQI may be determined to be an absolute value, or may be determined to be a relative value.

Positioning step: This positioning step may perform TDoA positioning using the AN position information and the AN weight information that have been determined in the previous step.

For example, based on a difference between the two ToA values measured from one pair of ANs and the location information, a hyperbola in which the positions of two ANs are respectively used as focal points is drawn, and another hyperbola is then drawn from the other pair of ToA values, the UE position can be measured by calculating coordinates corresponding to an intersection of the two hyperbolas. In this case, the UE position may be corrected or improved based on the weight for each AN.

In addition, the UE may draw a circle having a center point corresponding to the AN position using the ToA value measured by the AN and the position information measured by the AN, may calculate coordinates of the intersections of the plurality of circles, so that the UE position can be measured. At this time, the weight for each AN is applied so that the UE position can be corrected or improved.

On-Demand TDoA Positioning Mode

In the following, the on-demand TDoA positioning mode using the TDoA slot structure will be described. In the proposed on-demand TDoA positioning mode, upon receiving a request for the TDoA positioning information from the UE, the AN may transmit PSCCH information and PRS required for the UE TDoA positioning, and the UE may receive PSCCH information and PRS through the TDoA slot, so that the TDoA positioning can be performed.

As the main feature of the proposed TDoA on-demand positioning operation, the operation of requesting an AN role from the UE may be performed through the PSCCH of the NR-V2X slot before the TDoA slot. In addition, the UE may not perform a separate process of selecting or determining the AN scheduled to participate in the positioning, and the AN may not perform a separate process responding to the UE for information as to whether to participate in the UE positioning.

That is, the AN may broadcast information required for the UE TDoA positioning upon receiving a request from the UE. Therefore, the overall procedure for performing the proposed on-demand TDoA positioning can perform a similar procedure except for the process of requesting the UE TDoA positioning when compared with the broadcast TDoA positioning.

[STEP B-0]: The BS and/or UE, each of which serves as an AN for a UE scheduled to perform sidelink TDoA positioning may acquire and collect the TDoA positioning operation and the TDoA slot structure information using the same method as in [STEP A-0] of the above-described broadcast TDoA positioning process.

[STEP B-1]: Step B-1 is a first positioning process. In Step B-1, the UE scheduled to perform sidelink TDoA positioning may request the peripheral BS and/or UE to act as AN and to transmit PSCCH and PRS.

For example, the UE may request the AN role by sending a message (e.g., a request sidelink positioning message) to the peripheral BS and/or UE. At this time, the UE may transmit the minimum PQI capable of satisfying the LBS considered through the PSCCH, and the BS and/or UE, each of which satisfies the PSCCH, can be a candidate AN or a final AN. A detailed description thereof will hereinafter be given with reference to Step B-2.

In another embodiment, the UE may request the AN role by sending an SRS to the peripheral BS and/or UE. The request using the reference signal (RS) means that the BS and/or the UE satisfying the minimum PQI for the TDoA positioning may be a candidate AN or a final AN. A detailed description thereof will hereinafter be given.

[STEP B-2]: Step B-2 is a second step for sidelink TDoA positioning. In step B-2, a method for determining the candidate AN scheduled to participate in the TDoA positioning can be determined for the peripheral BS and/or UE.

For example, when the UE requests the AN role through transmission of a message (e.g., a request sidelink positioning message) to the peripheral BS and/or UE, RSRP of the DMRS of either the PSCCH or the PSSCH is measured. If the measured RSRP is equal to or higher than a specific threshold, the UE may perform the next procedure while serving as the candidate AN. If the measured RSRP is less than the specific threshold, absence of the candidate AN may be determined.

In another embodiment, when the UE requests the AN role by transmitting the SRS to the peripheral BS and/or UE, the UE may measure the RSRP. In this case, if the measured RSRP is equal to or higher than a specific threshold, the UE may perform the next procedure as the candidate AN. If the measured RSRP is less than a specific threshold, absence of the candidate AN may be determined.

The reason why the RSRP is used in the determination of the candidate AN is that, when the RSRP is equal to or less than a specific value, the distance between the UE and the candidate AN is too long. As a result, if the UE participates in the positioning as the AN, the accuracy for the UE ToA measurement may be affected by such long distance between the UE and the candidate AN. At this time, the threshold value can be set differently according to the LBS of the UE, may be predefined in the LBS, or may be determined by the location server/LMF and/or the BS, so that the determined information can be transmitted to the BS and the UE.

In another embodiment, when the received request PQI is satisfied, the peripheral BSS and/or UE may perform the next procedure while serving as the candidate AN. When the received request PQI is not satisfied, absence of the candidate AN may be determined.

In another embodiment, information as to whether the peripheral BS and/or UE will participate in TDoA positioning while serving as the candidate AN may be determined by the location server/LMF and/or the BS.

[STEP B-3]: Step B-3 is a third step of sidelink TDoA positioning. In Step B-3, information as to which BS and/or UE will participate in the positioning by serving as the final candidate AN is determined, so that the same process as the step A-2 indicating the above-described broadcast positioning process can be performed.

[STEP B-4]: Step B-4 is a fourth step for sidelink TDoA positioning. In step B-4, the finally selected AN may transmit the PSCCH and PRS through the TDoA slot, so that the same process as step A-3 of indicating the broadcast positioning process can be performed.

[STEP B-5]: Step B-5 is the last step of sidelink TDoA positioning. In step B-5, the UE can perform positioning upon receiving information about the TDoA slot, so that the same process as step A-4 of indicating the broadcast positioning process can be performed.

Figure 15:
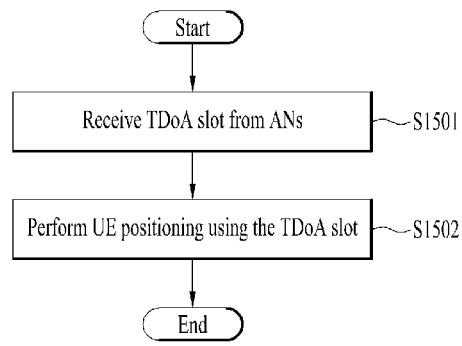

FIG. 15 is a flowchart illustrating the operations of the UE or AN related to the embodiment(s) of the present disclosure. The flowchart shown in FIG. 15 does not mean that all of the above steps are definitely performed or only the above steps are performed, and necessary steps are performed or unnecessary steps may be omitted according to contents described in the above-described embodiments. The operations of the above flowchart may construct one of the above-described proposals.

Referring to FIG. 15, in step S1501, the UE may receive the TDOA slot from anchor nodes (ANs). The TDoA slot may include control information of each of the anchor nodes (ANs), and PRSs transmitted by the anchor nodes (ANs). Control information may include at least one of position information of the anchor node (AN), a positioning quality indicator (PRS) pattern, and TDOA slot period information. PQI may represent the reliability of position information of the ANs. Each of the ANs transmitting the TDoA slot may have a PQI equal to or higher than a preset threshold.

The TDoA slot may include a control information pool and a PRS pool. Each AN located around the UE can reserve some resources by sensing resources in the control information pool, and can transmit control information thereof using the reserved resources. In addition, each AN located around the UE can reserve some resources by sensing resources in the PRS pool, and can transmit a PRS thereof using the reserved resources. Therefore, the TDoA slot received by the UE may include control information of each of the ANs and the PRS of each AN, and the control information and the PRS of each AN can be received to be distinguished from each other. In addition, the TDoA slot may include an AGC symbol and a guard symbol. On the other hand, the TDoA slot can be received by broadcasting the ANs without receiving the UE request, or may be received as a response to the request message of the UE.

In step S1502, the UE may measure the UE position using the TDoA slot. At this time, the UE may select the positioning ANs to be used for position measurement from among the plurality of ANs, each of which has transmitted a signal using the AN position information or the PQI, upon receiving the control information transmitted by the ANs. The UE may measure its own position using the selected positioning ANs. At this time, a weight may be assigned to each positioning AN, and the weight of each AN may be allocated using the AN position information or the PQI. Therefore, the UE may measure its own position in consideration of the weights of the positioning ANs.

The present disclosure relates to a method and procedure for allowing a UE to directly perform TDoA positioning using a sidelink without assistance of the location server/LMF and/or the BS. Mainly, the present disclosure proposes the independent TDoA slot structure for sidelink TDoA positioning, and proposes both the broadcast TDoA positioning mode using the proposed TDoA slot structure and the on-demand TDoA positioning mode. The above-described UE TDoA positioning method and the operations thereof may provide the following advantages.

A method for performing the positioning process by the UE can be performed at a higher speed than the legacy method for performing UE positioning through the location server/LMF and/or the BS.

Through the independent TDoA slot insertion, no interference may occur in the legacy NR-V2X slot and service operations, and at the same time the sidelink TDoA positioning operation can be performed independently.

PSCCH through which the SCI of the AN is transmitted may be included in the TDoA slot, so that the amount of signaling overhead required for sidelink TDoA positioning can be significantly reduced.

The UE can perform a high-speed positioning operation through reception of the PSCCH and PRS of the TDoA slot. As a result, the other UE moving at a high speed can also perform the positioning operation.

When a UE (such as a mobile phone) having power usage restrictions performs positioning, the UE may receive the PSCCH and PRS only within the TDoA slot period, resulting in reduction in power consumption.

Through the broadcast TDoA positioning mode and the on-demand TDoA positioning mode, the plurality of UEs can simultaneously perform the positioning operation, such that such modes can increase frequency use efficiency.

Since examples of the above-described proposals can also be used as implementation methods of the present disclosure, it will also be apparent that the examples of the above-described proposals may be considered to be a kind of proposed methods. Although the above-described proposals can be implemented independently from each other, it should be noted that the above-described proposals can also be implemented as a combination (or a merged format) of some proposals. For example, although the proposed method has been disclosed based on the 3GPP NR system for convenience of description, a system to which the proposed method is applied may also be extended to another system other than the 3GPP NR system. For example, the proposed methods of the present disclosure may also be extendedly applied for D2D communication. Here, D2D communication indicates that a UE communicates with a different UE directly using a radio channel. Herein, although the UE refers to a user equipment (UE), when a network device such as a BS (or eNB) transmits and/or receives a signal according to a communication scheme between UEs, the UE may also be regarded as a sort of the UE. In addition, the proposed methods of the present disclosure may be limitedly applied only to MODE 3 V2X operation (and/or MODE 4 V2X operation). In addition, the proposed methods of the present disclosure may be limitedly applied only to a preconfigured (/signaled) (specific) V2X channel (/signal) transmission (e.g., PSSCH (and/or (interlinked) PSCCH and/or PSBCH)). In addition, the proposed methods of the present disclosure may be limitedly applied only to the case that a PSSCH and an (interlinked) PSCCH are adjacently (and/or non-adjacently) transmitted (on a frequency domain) (and/or a transmission based on a preconfigured (/signaled) MCS (and/or coding rate and/or resource block) (value (/range)) is performed). In addition, the proposed methods of the present disclosure may be limitedly applied only to MODE #3 (and/or MODE #4) V2X carrier (and/or (MODE #4 (/3) sidelink (/uplink) SPS (and/or sidelink (/uplink) dynamic scheduling) carrier). In addition, the proposed methods of the present document may be (limitedly) applied only if a synchronization signal (transmission (and/or reception)) resource position and/or a number (and/or V2X resource pool-related subframe position and/or number (and/or subchannel size and/or number)) are the same (and/or (some) different) between carriers. As an example, the proposed schemes of the present invention can be extended and applied to V2X communication between the BS and the UE. For example, the proposed schemes of the present disclosure may be limited only to UNICAST (sidelink) communication (and/or MULTICAST (or GROUPCAST) (sidelink) communication and/or BROADCAST (sidelink) communication).

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
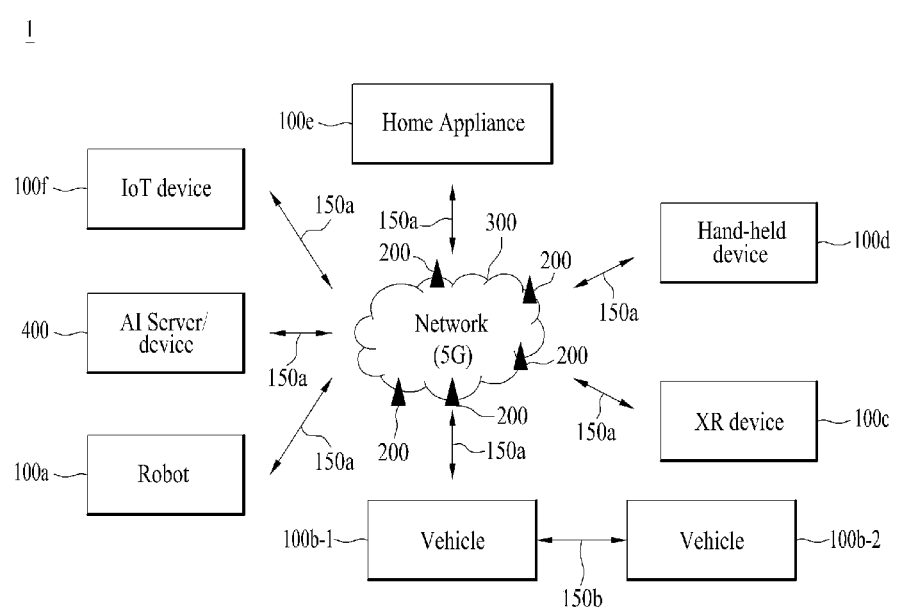
FIGS. 16 to 25 are block diagrams illustrating various devices applicable to embodiment(s) of the present disclosure.

FIG. 16 illustrates a communication system applied to the present disclosure.

Referring to FIG. 16, a communication system applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot $100a$, vehicles $100b$-1 and $100b$-2, an eXtended Reality (XR) device $100c$, a hand-held device $100d$, a home appliance $100e$, an Internet of Things (IoT) device $100f$, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device $200a$ may operate as a BS/network node with respect to other wireless devices.

The wireless devices $100a$ to $100f$ may be connected to the network 300 via the BSs 200. An AI technology may be applied to the wireless devices $100a$ to $100f$ and the wireless devices $100a$ to $100f$ may be connected to the AI server 400 via the network 300. The network 300 may be configured using a 3G network, a 4G (e.g., LTE) network, or a 5G (e.g., NR) network. Although the wireless devices $100a$ to $100f$ may communicate with each other through the BSs 200/network 300, the wireless devices $100a$ to $100f$ may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices to which the Present Disclosure is Applied

Figure 17:
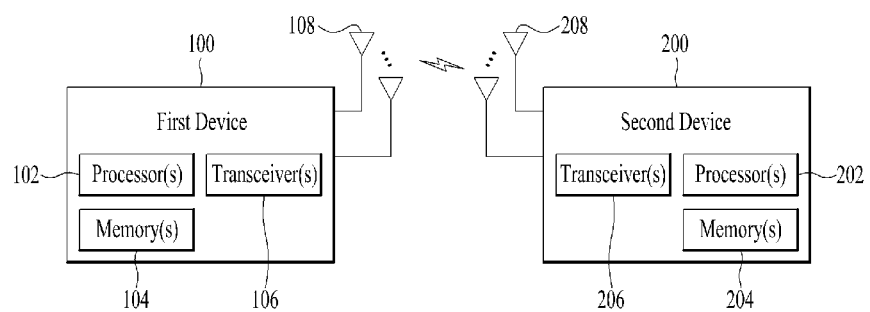

FIG. 17 illustrates wireless devices applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Here, wireless communication technologies implemented in the wireless devices (XXX, YYY) of the present disclosure may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present disclosure may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present disclosure is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

Example of a Signal Process Circuit to which the Present Disclosure is Applied

Figure 18:
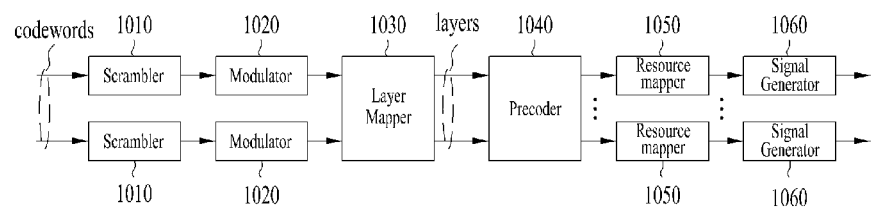

FIG. 18 illustrates a signal process circuit for a transmission signal.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
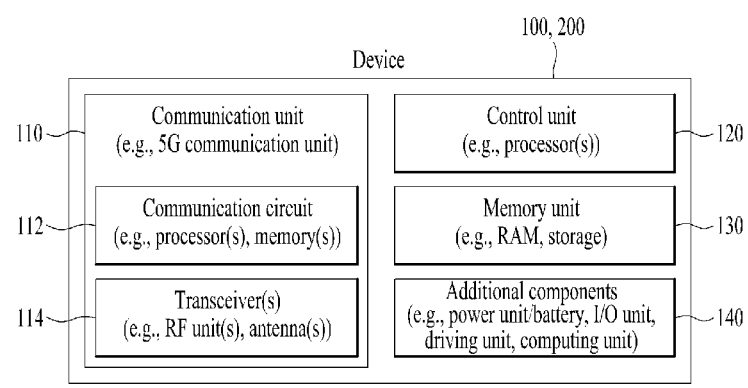

Application Example of a Wireless Device to which the Present Disclosure is Applied FIG. 19 illustrates another example of a wireless device applied to the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast UE, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Example of Hand-Held Device to which the Present Disclosure is Applied

Figure 20:
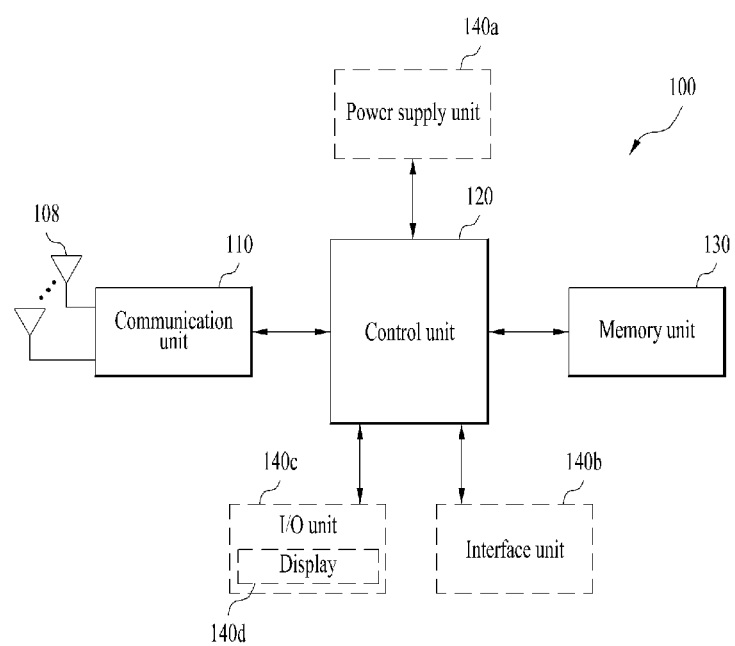

FIG. 20 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user UE (UT), a Mobile Subscriber Station (MSS), a Subscriber Station (SS), an Advanced Mobile Station (AMS), or a Wireless UE (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
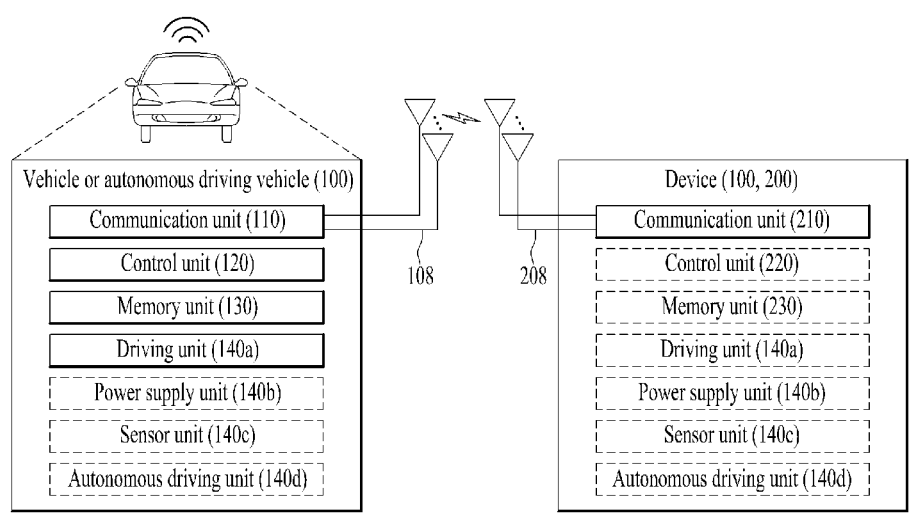

Example of a Vehicle or an Autonomous Driving Vehicle to which the Present Disclosure is Applied FIG. 21 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 21, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of AR/VR and Vehicle to which the Present Disclosure is Applied

Figure 22:
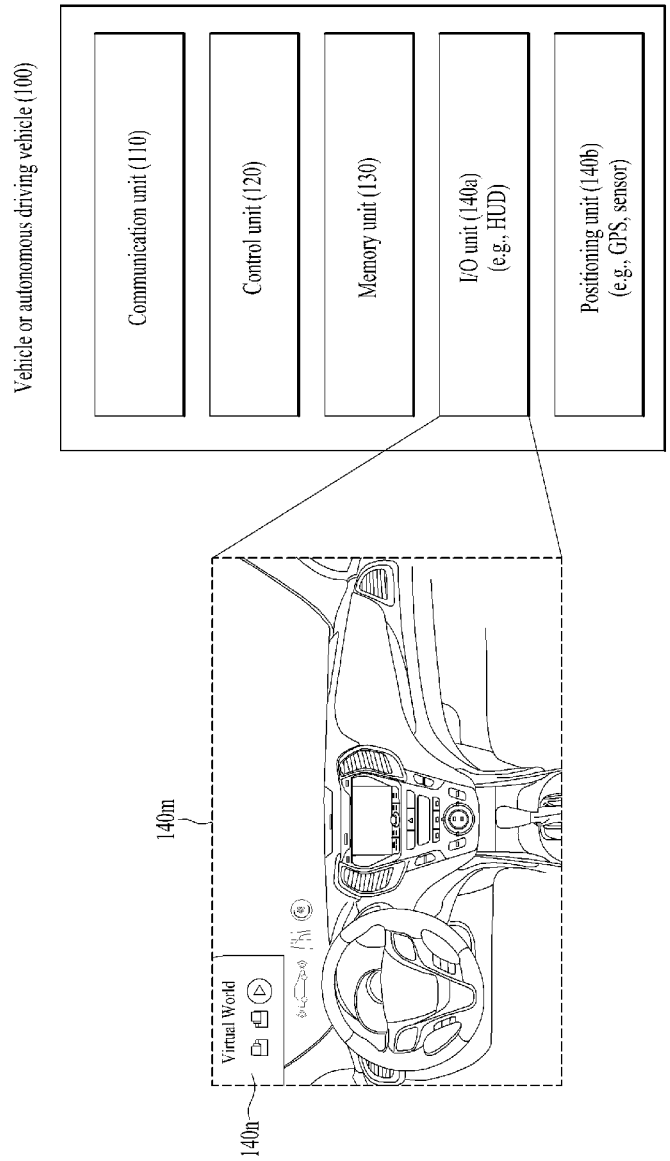

FIG. 22 illustrates a vehicle applied to the present disclosure. The vehicle may be implemented as a transport means, an aerial vehicle, a ship, etc.

Referring to FIG. 22, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 19.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormality to neighboring vehicles through the communication unit 110. According to situation, the control unit 120 may transmit the vehicle position information and the information about driving/vehicle abnormality to related organizations.

Examples of XR Device to which the Present Disclosure is Applied

Figure 23:
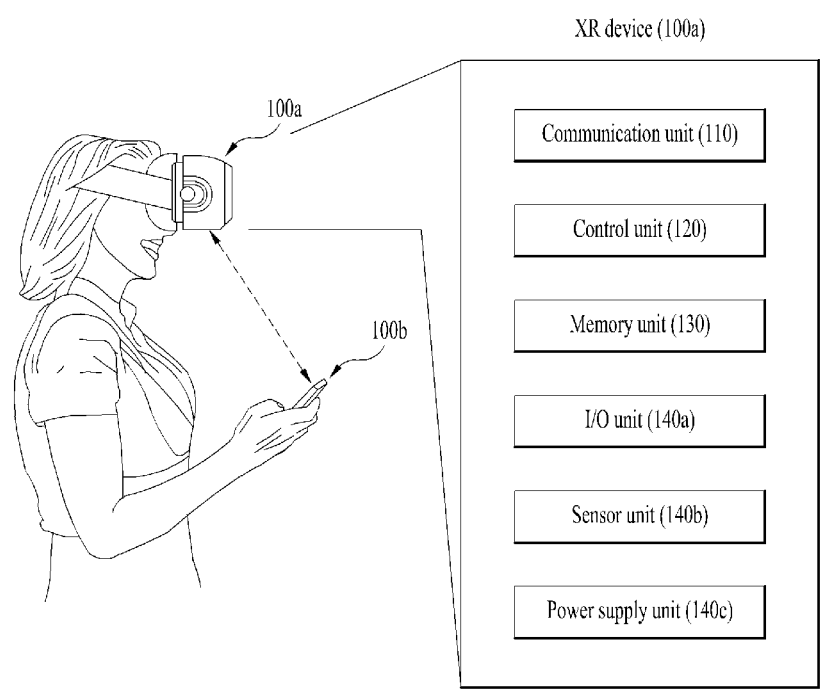

FIG. 23 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 23, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 19, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Examples of Robot to which the Present Disclosure is Applied

Figure 24:
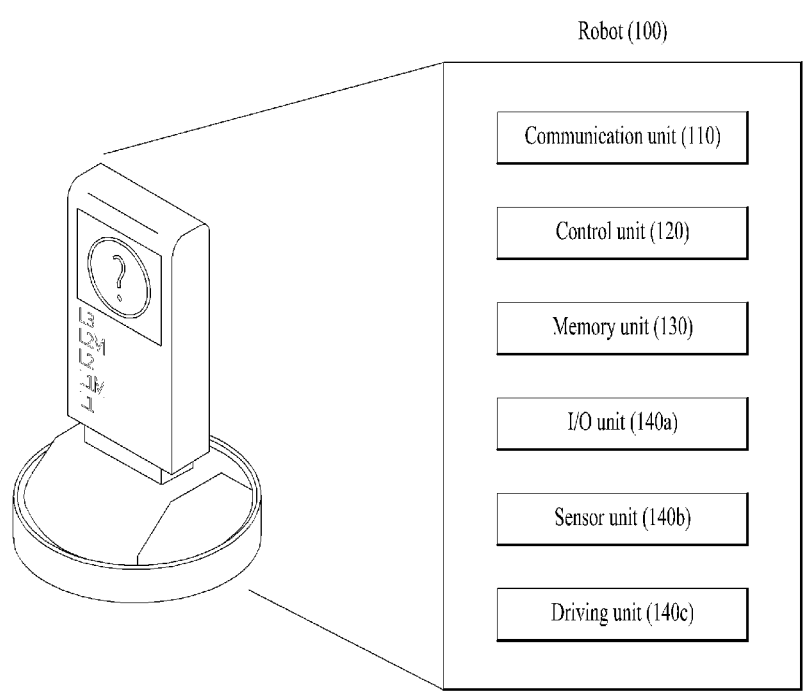

FIG. 24 illustrates a robot applied to the present disclosure. The robot may be categorized into an industrial robot, a medical robot, a household robot, a military robot, etc., according to a used purpose or field.

Referring to FIG. 24, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 19, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Examples of AI Device to which the Present Disclosure is Applied

Figure 25:
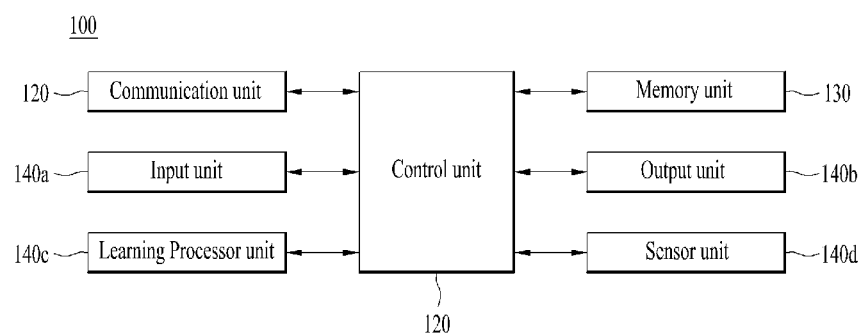

FIG. 25 illustrates an AI device applied to the present disclosure. The AI device may be implemented by a fixed device or a mobile device, such as a TV, a projector, a smartphone, a PC, a notebook, a digital broadcast UE, a tablet PC, a wearable device, a Set Top Box (STB), a radio, a washing machine, a refrigerator, a digital signage, a robot, a vehicle, etc.

Referring to FIG. 25, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 19, respectively.

The communication unit 110 may transmit and receive wired/radio signals (e.g., sensor information, user input, learning models, or control signals) to and from external devices such as other AI devices (e.g., 100x, 200, or 400 of FIG. 16) or an AI server (e.g., 400 of FIG. 16) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information that is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 16). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 16). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL APPLICABILITY

The above-mentioned embodiments of the present disclosure are applicable to various mobile communication systems.

The invention claimed is:

1. A method by a user equipment (UE), the method comprising:
   transmitting first control information including a first request for PRS transmission to a peer UE in a first time slot;
   receiving second control information from the peer UE in a second time slot in response to the transmitted first control information;
   receiving a first positioning reference signal (PRS) from the peer UE in the second time slot based on the second control information; and
   performing time difference of arrival (TDoA) measurements based on the first PRS,
   wherein the second control information includes information regarding the peer UE and information regarding the first PRS.

2. The method according to claim 1, wherein:
   the second control information includes a second request for PRS transmission, and the method comprises:
   transmitting third control information and a second PRS in a third time slot based on the second request for PRS transmission.

3. The method according to claim 2, wherein:
   the second control information includes a minimum positioning quality indicator (PQI) required for local based service (LBS),
   wherein the third control information and the second PRS are transmitted based on a PQI of the UE being equal to or higher than the minimum PQI, and
   wherein the PQI of the UE represents reliability of positioning information of the UE.

4. The method according to claim 2, further comprising:
   sensing and reserving resources in the third time slot, wherein the third control information and the second PRS are transmitted through the reserved resources.

5. The method according to claim 1, wherein:
   the second time slot further includes at least an auto-gain control (ACG) symbol or a guard symbol.

6. A user equipment (UE) comprising:
   at least one processor; and
   at least one computer memory operatively connected to the at least one processor, and configured to store instructions that cause the at least one processor to perform operations comprising
   transmitting first control information including a first request for PRS transmission to a peer UE in a first time slot;
   receiving second control information from the peer UE in a second time slot in response to the transmitted first control information;
   receiving a first positioning reference signal (PRS) from the peer UE in the second time slot based on the second control information; and performing time difference of arrival (TDoA) measurements based on the first PRS, wherein the second control information includes information regarding the peer UE and information regarding the first PRS.

7. A method by a user equipment (UE), the method comprising:

receiving first control information including a first request for PRS transmission from a peer UE in a first time slot; and transmitting second control information and a first positioning reference signal (PRS) to the peer UE in a second time slot, based on the first control information, and wherein the second control information includes information regarding the UE and information regarding the first PRS.

* * * * *